US011632509B2

(12) United States Patent
Ramakrishnan

(10) Patent No.: US 11,632,509 B2
(45) Date of Patent: Apr. 18, 2023

(54) IMAGE SENSOR WITH REDUCED COLUMN FIXED PATTERN NOISE

(71) Applicant: SEMICONDUCTOR COMPONENTS INDUSTRIES, LLC, Phoenix, AZ (US)

(72) Inventor: Shankar Ramakrishnan, Bangalore (IN)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 32 days.

(21) Appl. No.: 17/249,434

(22) Filed: Mar. 2, 2021

(65) Prior Publication Data
US 2022/0286633 A1 Sep. 8, 2022

(51) Int. Cl.
*H04N 5/365* (2011.01)
*H04N 5/3745* (2011.01)
*H04N 5/378* (2011.01)

(52) U.S. Cl.
CPC ........... *H04N 5/3658* (2013.01); *H04N 5/378* (2013.01); *H04N 5/37455* (2013.01); *H04N 5/37457* (2013.01)

(58) Field of Classification Search
CPC ............. H04N 5/3658; H04N 5/37455; H04N 5/37457; H04N 5/378
See application file for complete search history.

(56) References Cited

U.S. PATENT DOCUMENTS

| | | |
|---|---|---|
| 8,830,361 B2 | 9/2014 | Chou |
| 9,819,890 B2 | 11/2017 | Wang |
| 10,171,765 B1* | 1/2019 | Ebihara ............... H04N 5/2355 |
| 2005/0068439 A1 | 3/2005 | Kozlowski |
| 2008/0210848 A1 | 9/2008 | Purcell |
| 2009/0002536 A1 | 1/2009 | Nakamura |
| 2010/0309356 A1* | 12/2010 | Ihara .................... H04N 5/3742 348/300 |

* cited by examiner

*Primary Examiner* — Michael E Teitelbaum
(74) *Attorney, Agent, or Firm* — Treyz Law Group, P.C.; Tianyi He

(57) ABSTRACT

An image sensor may include an array of image pixels arranged in rows and columns. Each column of pixels may be coupled to current source transistors and a threshold voltage mitigation circuit. The threshold voltage mitigation circuit may include a long p-channel device for producing a reference current for the current source transistors. The mitigation circuit also includes an autozero transistor and a sampling transistor for passing a global control voltage to the current source transistors. The global control voltage may be generated using a control voltage generator that includes current mirroring circuits and a replica of the current source transistors and the threshold voltage mitigation circuit.

21 Claims, 6 Drawing Sheets

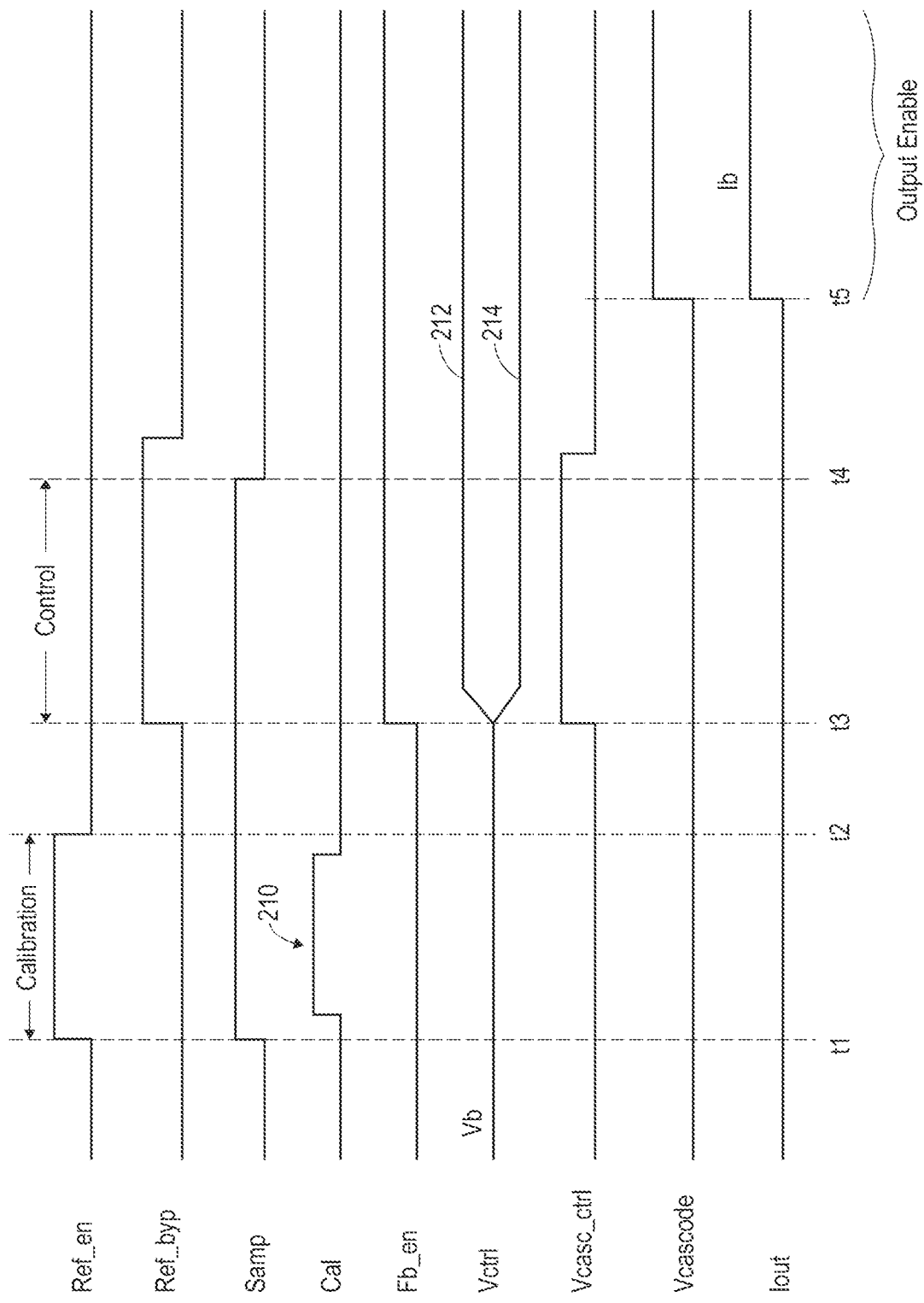

IMAGE SENSOR WITH REDUCED COLUMN FIXED PATTERN NOISE

BACKGROUND

This relates generally to imaging devices and more particularly, to image sensors having large pixel arrays.

Image sensors are commonly used in electronic devices such as cellular telephones, cameras, and computers to capture images. In a typical arrangement, an electronic device is provided with an array of image pixels arranged in pixel rows and pixel columns. Each pixel column is connected to a respective current source. In practice, there can be mismatch between different current sources from column-to-column, which contributes to column fixed pattern noise and horizontal shading.

It is within this context that the embodiments described herein arise.

BRIEF DESCRIPTION OF THE DRAWINGS

FIG. 6 is a timing diagram showing illustrative signal waveforms involved in operating the current source and threshold voltage mismatch mitigation circuitry of the type shown in connection with FIGS. 3-5 in accordance with some embodiments.

DETAILED DESCRIPTION

Embodiments of the present invention relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds or thousands or millions of pixels (e.g., megapixels). Image sensors may include control circuitry such as circuitry for operating the pixels and readout circuitry for reading out image signals corresponding to the electric charge generated by the photosensitive elements.

Figure 1:
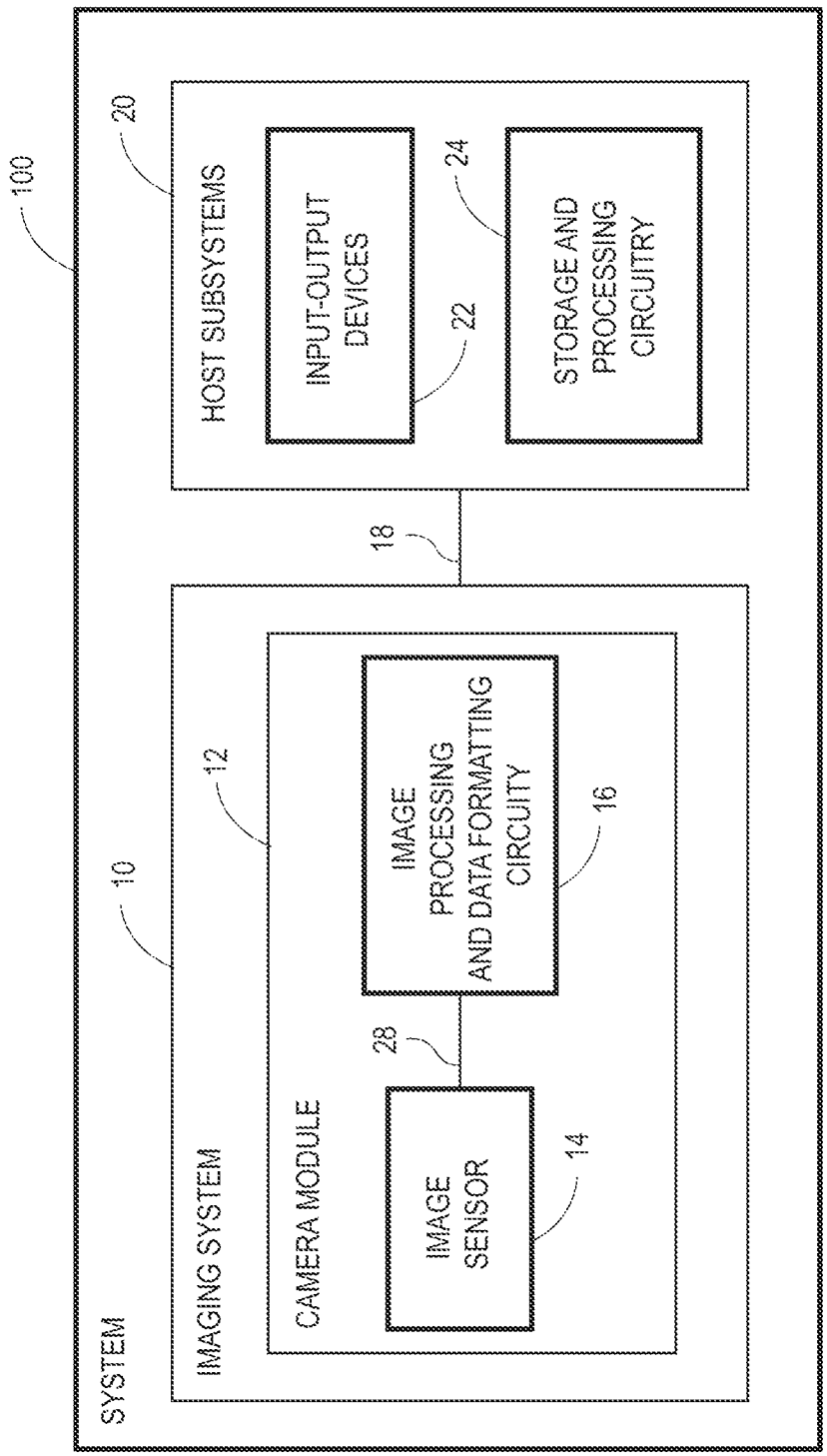
FIG. 1 is a diagram of an illustrative electronic device having an image sensor in accordance with some embodiments.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14. Image sensor 14 may include photosensitive elements (i.e., image sensor pixels) that convert the light into digital data. Image sensors may have any number of pixels (e.g., hundreds, thousands, millions, or more). A typical image sensor may, for example, have millions of pixels (e.g., megapixels). As examples, image sensor 14 may further include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SoC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
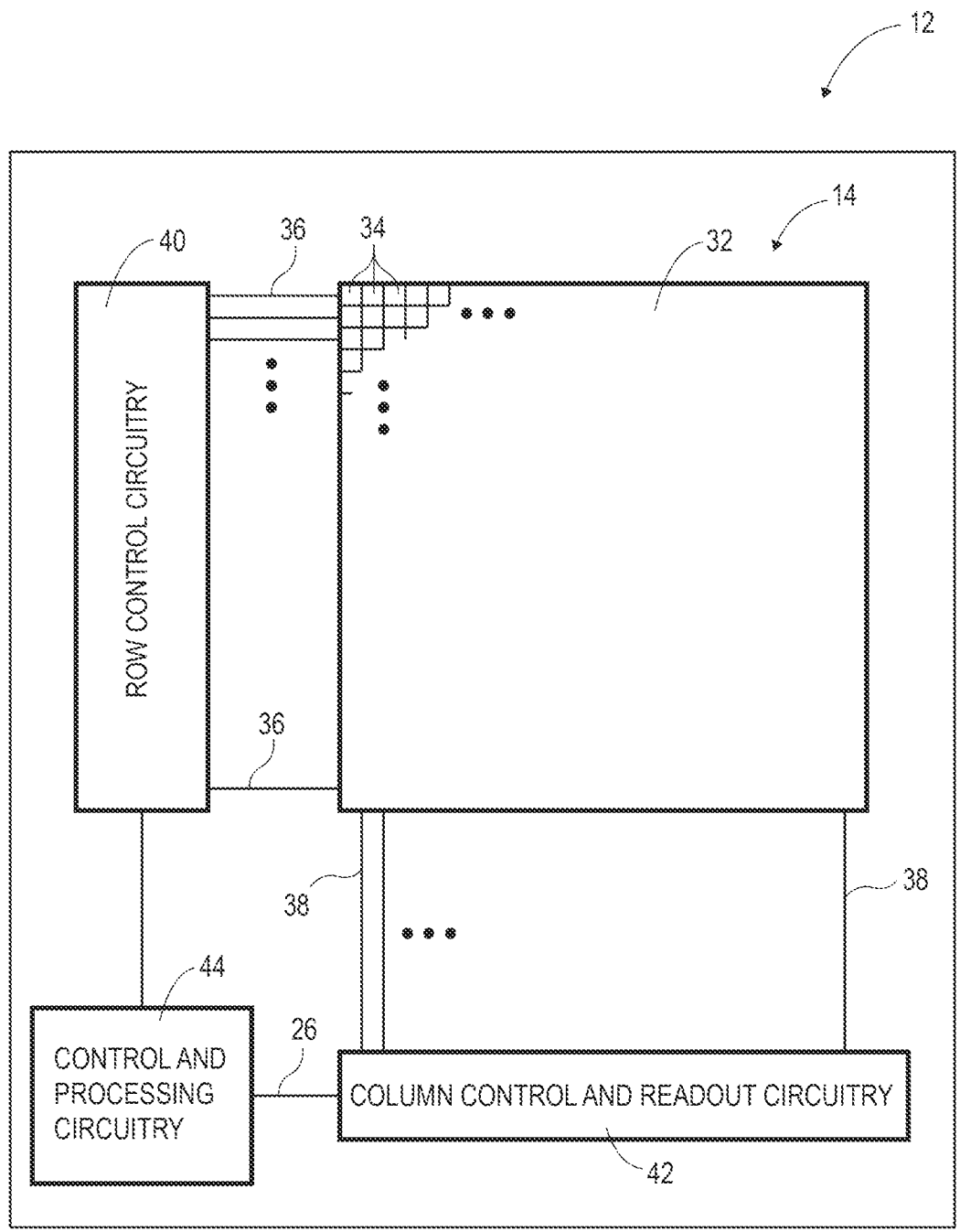
FIG. 2 is a diagram of an illustrative pixel array and associated row and column control circuitry for reading out image signals from an image sensor in accordance with some embodiments.

An example of an arrangement of image sensor 14 of FIG. 1 is shown in FIG. 2. As shown in FIG. 2, image sensor 14 may include control and processing circuitry 44. Control and processing circuitry 44 (sometimes referred to as control and processing logic) may sometimes be considered part of image processing and data formatting circuitry 16 in FIG. 1. Image sensor 14 may include a pixel array such as array 32 of pixels 34 (sometimes referred to herein as image sensor pixels, imaging pixels, or image pixels). Control and processing circuitry 44 may be coupled to row control circuitry 40 via control path 27 and may be coupled to column control and readout circuits 42 via data path 26.

Row control circuitry 40 may receive row addresses from control and processing circuitry 44 and may supply corresponding row control signals to image pixels 34 over control paths 36 (e.g., pixel reset control signals, charge transfer control signals, blooming control signals, row select control signals, dual conversion gain control signals, or any other desired pixel control signals).

Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row driver circuitry 40 and image data associated with image pixels 34 of that pixel row may be read out by column readout circuitry 42 on column lines 38. Column readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel readout values to control and processing logic 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Figure 3:
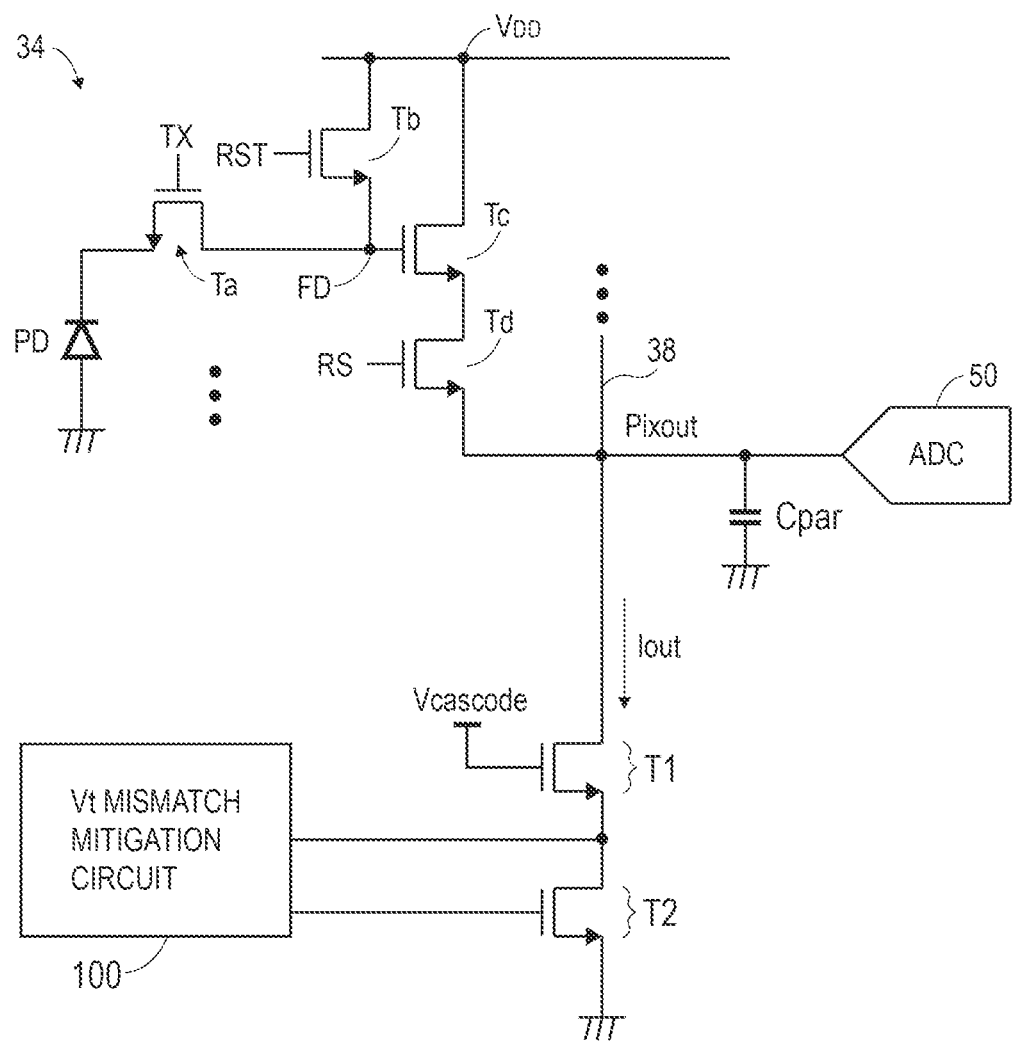
FIG. 3 is a diagram of an image sensor pixel coupled to illustrative current source and threshold voltage mismatch mitigation circuitry in accordance with some embodiments.

FIG. 3 is a diagram of a column of image sensor pixels coupled to illustrative current source and threshold voltage mismatch mitigation circuitry in accordance with some embodiments. As shown in FIG. 3, an image sensor pixel such as pixel 34 may include a photosensitive element such as a photodiode PD and a charge transfer transistor such as charge transfer transistor Ta having a first source-drain terminal coupled to photodiode PD, a second source-drain terminal coupled to floating diffusion node FD, and a gate terminal configured to receive charge transfer control signal TX. Charge transfer transistor Ta is sometimes referred to as a charge transfer gate. Floating diffusion node FD is sometimes referred to as a floating diffusion region.

Pixel 34 also includes a reset transistor Tb having a drain terminal coupled to a positive power supply line (e.g., a power supply terminal on which positive power supply voltage VDD is provided), a source terminal coupled to floating diffusion node FD, and a gate terminal configured to receive a reset control signal RST. The terms "source" terminal and "drain" terminal when referring to current-conducting terminals of a metal-oxide semiconducting transistor can be used interchangeably and are sometimes referred to as "source-drain" terminals.

Pixel 34 also includes a source follower transistor Tc having a drain terminal coupled to the positive power supply line, a gate terminal coupled to floating diffusion node FD, and a source terminal. Source follower transistor Tc is sometimes simply referred to as a "source follower." Pixel 34 may further including a row select transistor Td having a drain terminal coupled to the source terminal of source follower Tc, a gate terminal configured to receive a row select control signal RS, and a source terminal coupled to a corresponding pixel output column line 38. Line 38 may also sometimes be referred to as a pixel output line, an output line, and/or a column line.

Transistors Ta-Tb may all be n-type metal-oxide semiconductor (NMOS) transistors (e.g., n-channel devices). Although only one pixel 34 shown in FIG. 3, any number of pixels 34 may be coupled to column line 38 for readout. For example, column line 38 may be coupled to more than 10 pixels in the column, 10-100 pixels in the column, hundreds of pixels in the column, or thousands of pixels in the column.

Column line 38 may be coupled to a ground line (e.g., a ground power supply line on which a ground voltage or other low voltage is provided) via series-connected transistors T1 and T2. Transistors T1 and T2 may also be n-type transistors (e.g., NMOS devices). Transistor T2 has source terminal coupled to ground, a gate terminal configured to receive a bias voltage Vb, and a drain terminal. Transistor T1 has a source terminal coupled to the drain terminal of transistor T2, a gate terminal configured to receive a cascode bias voltage Vcascode, and a drain terminal coupled to column line 38. Configured in this way, transistor T2 operates as a current source transistor, whereas transistor T1 serves as a cascode transistor. Transistors T1 and T2 are sometimes referred to collectively as a very low noise (VLN) current source or VLN current source transistors. An output current Iout flows from column line 38 through the VLN transistors.

Pixel output line 38 may be coupled to a corresponding analog-to-digital converter (ADC) circuit 50 that is configured to convert an analog signal read out from a selected signal to its digital equivalent. ADC circuit 50 may be considered part of column readout circuitry 42 (see FIG. 2). The total amount of capacitance on the pixel output line 38 may be represented by capacitance Cpar, which can be fairly high depending on the number of pixels 34 attached to line 38.

In practice, there can be mismatch between the VLN current sources coupled to the high capacitance column lines 38. For instance, the threshold voltage of transistor T1 and/or T2 in one pixel column can be different than the threshold voltage of transistor T1 and/or T2 in an adjacent pixel column due to process, temperature, or voltage (PVT) variations. A mismatch in threshold voltage can result in mismatched Iout current levels from column to column. This mismatch between the VLN current sources is a significant contributor to column fixed pattern noise and horizontal shading. One method of reducing mismatch is to increase the size of the VLN transistors. Even large devices, however, can still exhibit mismatched device parameters on the order of one percent or more, which can lead to substantial variation in settling times during reset and signal sampling phases between different columns, resulting in noticeable column fixed pattern noise and horizontal shading.

In accordance with an embodiment, the VLN transistors T1 and T2 can be coupled to mismatch mitigation circuitry such as threshold voltage (Vt) mismatch mitigation circuit 100. Each pixel column may be coupled to its own Vt mismatch mitigation circuit 100. Threshold voltage mismatch mitigation circuit 100 may be configured to compensate for device variations in the VLN current source transistors.

Figure 4:
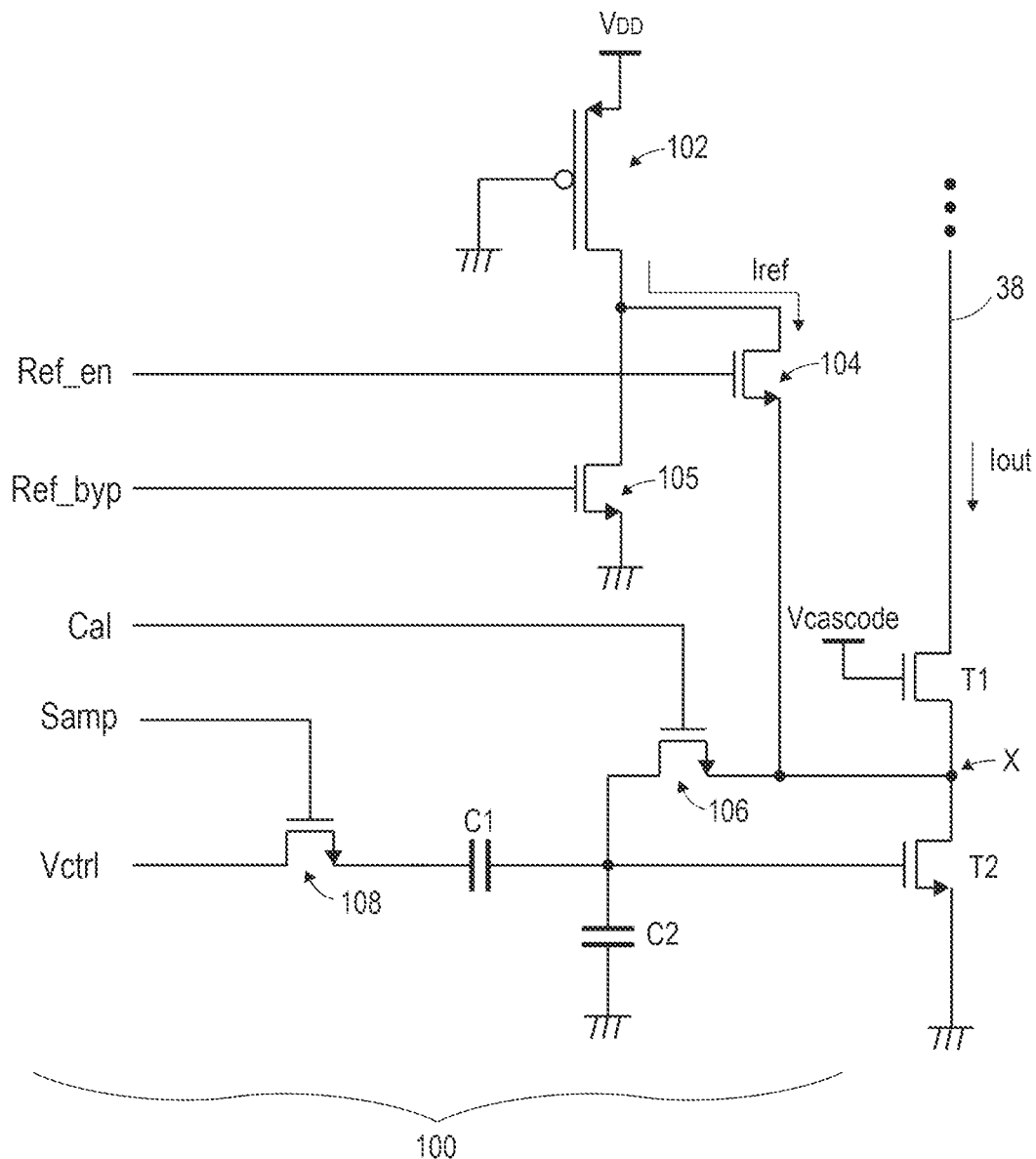
FIG. 4 is a circuit diagram of illustrative threshold voltage mismatch mitigation circuitry in accordance with some embodiments.

FIG. 4 is a circuit diagram of an illustrative threshold voltage mismatch mitigation circuit 100. As shown in FIG. 4, mismatch mitigation circuit 100 may include a p-type transistor 102, an enable transistor 104, a bypass transistor 105, an autozero transistor 106, a sampling transistor 108, and capacitors C1 and C2. Transistors 104, 105, 106, and 108 may all be n-channel transistors (e.g., n-type metal-oxide semiconductor or NMOS transistors).

Transistor 102 can be a p-channel metal-oxide semiconductor (PMOS) transistor having a source terminal coupled to a positive power supply line (e.g., a power supply terminal on which positive power supply voltage VDD is provided), a gate terminal coupled to a ground line, and a drain terminal. Transistor 102 may be a long p-channel device biased using a high source-to-gate voltage (Vsg). In the example of FIG. 4, the Vsg of transistor 102 is set to VDD. A Vsg of VDD provides a high overdrive condition at transistor 102, which generates a highly matched reference current Iref during an autozeroing phase. A larger overdrive voltage also helps reduce a device's sensitivity to IR drops in the power supply terminals. Transistor 102 may also sometimes be referred to as a pull-up transistor.

Transistor 102 can be implemented as multiple p-channel transistors connected in series. For example, transistor 102 might include at least two series-connected PMOS transistors, three or more series-connected PMOS transistors, four or more series-connected PMOS transistors, 3-5 series-connected PMOS transistors, 2-6 series-connected PMOS transistors, 4-10 series-connected PMOS transistors, or more than 10 series-connected PMOS transistors. Transistor 102 may have an overall effective channel length that is greater than the channel length of current source transistor T2. Transistor 102 may, for example, have a gate length that is at least 10× longer than that of T2, 10-20× longer than that of T2, at least 5× longer than that of T2, 2-5× longer than that of T2, 5-10× longer than that of T2, $\lambda$—10× longer than that of T2, more than 20× longer than that of T2, etc. Configured in this way, transistor 102 can be used to output stable a reference current Iref and is sometimes referred to as a reference current generator.

The reference current Iref can flow from transistor 102 to the VLN transistors when enable transistor 104 is activated (turned on). The value of Iref can change depending on the operating conditions of the image sensor (e.g., depending on the current supply voltage level and operating temperature). Enable transistor 104 has a drain terminal coupled to the drain terminal of transistor 102, a gate terminal configured to receive a reference current enable signal Ref_en, and a source terminal coupled to a node X that is interposed between transistors T1 and T2. Enable signal Ref_en can be asserted (e.g., driven high) to turn on transistor 104 and can be deasserted (e.g., driven low) to turn off transistor 104.

Bypass transistor 105 has a drain terminal coupled to the drain terminal of reference current generating transistor 102, a source terminal coupled to ground, and a gate terminal configured to receive a reference bypass control signal Ref_byp. Control signal Ref_byp can be asserted (e.g., driven high) to turn on bypass transistor 105 and can be deasserted (e.g., driven low) to turn off bypass transistor 105. Bypass transistor 105 is optional. Bypass transistor 105, when turned on, can be used to ensure the same voltage drop on the ground line during a calibration phase and a control phase (see FIG. 6). This can help maintain the same output current Iout for all pixel columns, independent of any voltage drop across the length of the ground line.

Autozero transistor 106 has a first source-drain terminal (e.g., a source terminal) coupled to node X, a second source-drain terminal (e.g., a drain terminal) coupled to the gate of current source transistor T2, and a gate terminal configured to receive calibration control signal Cal. Control signal Cal can be asserted (e.g., driven high) to turn on autozero transistor 106 and can be deasserted (e.g., driven low) to turn off autozero transistor 106. Autozero transistor 106, when turned on, configures current source transistor T2 in a diode-connected arrangement. When configured with this diode connection, the voltage at the gate terminal of transistor T2 will adjust proportionally to reference current Iref and change as a function of the threshold voltage (Vt) of T2. Operated in this way, autozero transistor 106 can be used to minimize the contribution of any Vt mismatches to variation in Iout between the different pixel columns.

Capacitor C2 has a first terminal coupled to the gate of transistor T2 and a second terminal coupled to ground. Capacitor C1 has a first terminal coupled to the gate of transistor T2 and a second terminal coupled to sampling transistor 108. Capacitor C1 serves as an AC coupling capacitor, whereas capacitor C2 serves as a temporary storage node to hold a sampled voltage at the gate of transistor T2. Capacitor C1 can be smaller than capacitor C2. For example, capacitor C1 may be 1/10 the size of C2, 1/5 the size of C2, 1/10-1/5 the size of C2, no more than 1/2 the size of C2, no more than 1/3 the size of C2, no more than 1/4 the size of C2, no more than 1/5 the size of C2, 1/20-1/4 the size of C2, or other suitable fraction of capacitor C2. Capacitors C1 and C2 provide a capacitor divider at the gate of transistor T2. The ratio of C1 and C2 is selected to provide a desired adjustment range given the swing of input signal Vctrl.

Sampling transistor 108 has a first source-drain terminal (e.g., source terminal) coupled to capacitor C2, a second source-drain terminal (e.g., drain terminal) configured to receive signal Vctrl, and gate terminal configured to receive sampling control signal Samp. Control signal Samp can be asserted (e.g., driven high) to turn on sampling transistor 108 and can be deasserted (e.g., driven low) to turn off sampling transistor 108. When transistor 108 is activated, control signal Vctrl can be passed to the gate of current source transistor T2 via AC coupling capacitor C1.

Figure 5:
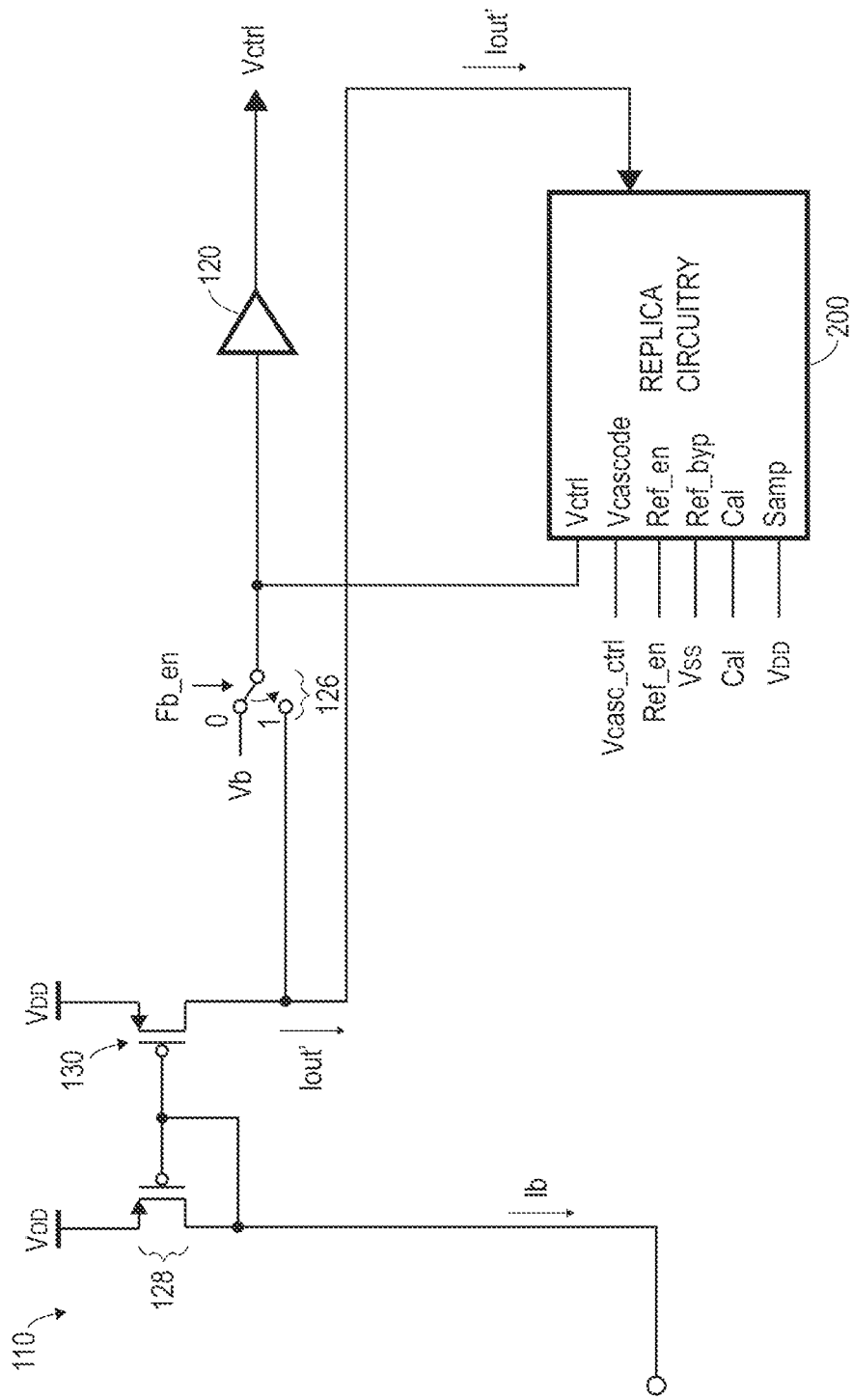
FIG. 5 is a diagram of an illustrative control voltage generator in accordance with some embodiments.

Control signal Vctrl may be a global control voltage that is generated by a control voltage generator such as voltage generator 110 (see, e.g., FIG. 5). While there is one instance of circuit 100 in every pixel column, all of mitigation circuits 100 can share one voltage generator 110 (e.g., an array of pixels needs only one voltage generator 110). As shown in FIG. 5, control voltage generator 110 may include p-type transistors 128 and 130, a switch 126, and associated replica circuitry 200.

Transistor 128 has a source terminal coupled to the positive power supply line, a drain terminal configured to receive a bias current input Ib, and a gate terminal coupled to its drain terminal in a diode-connected configuration. Bias current Ib represents the target current level for the output current Iout in each pixel column and is fed as an input to voltage generator 110.

Transistor 130 has a source terminal coupled to the positive power supply line, a drain terminal, and a gate terminal coupled to the gate terminal of transistor 128.

Transistors 128 and 130 therefore serve collectively as a second current mirror circuit. The amount of current mirrored from transistor 128 onto transistor 130 depends on the ratio of the size of transistor 128 to the size of transistor 130. In one suitable embodiment, the sizes of transistors 120, 122, 128, and 130 are all the same so the corresponding current Iout' generated at the drain terminal of transistor 130 will be equal to the input bias current level Ib.

Switch 126 may be a single pole double throw (SPDT) switch. Single pole double through switch 126 has a first switch terminal configured to receive input bias voltage Vb, a second switch terminal coupled to the drain terminal of transistor 130, a third switch terminal on which control voltage signal Vctrl is generated, and a control terminal configured to receive feedback enable signal Fb_en. Generator 110 may include a buffer circuit such as buffer 120 for driving signal at its output.

When feedback enable signal Fb_en is deasserted (e.g., driven low), switch 126 may be configured to connect its first and third switch terminals so that Vctrl is set to the bias voltage level Vb. When feedback signal Fb_en is asserted (e.g., driven high), switch 126 may be configured to connect its second the third switch terminals so that the voltage at the drain terminal of transistor 130 is passed through to the Vctrl output port of generator 110. Voltage Vb may represent an intermediate bias voltage level between VDD and ground. Depending on the value of bias current Ib, control output Vctrl can rise above Vb or fall below Vb. As an example, voltage Vb can be set to VDD/2 or other suitable voltage level.

Replica circuitry 200 can be a replica (copy) of Vt mismatching mitigation circuit 100 and the VLN transistors T1 and T2 (i.e., replica circuitry 200 may include a copy of every component shown in FIG. 4). Although the structure is substantially similar, some of the control signals can be different than the ones illustrated in FIG. 4. Transistor 108 within replica circuitry 200 can have a source-drain terminal configured to receive the control voltage Vctrl output by generator 110. Transistor T1 within replica circuitry 200 will have a gate terminal configured to receive Vcasc_ctrl, which can be different than Vcascode shown in FIG. 4. Enable transistor 104 within replica circuitry 200 may have a gate terminal configured to receive the same Ref_en signal as FIG. 4. Transistor 105 within replica circuitry 200 may have a gate terminal connected to ground (e.g., transistor 105 within the replica may be always deactivated). Autozero transistor 106 within replica circuitry 200 may have a gate terminal configured to receive the same Cal signal as FIG. 4. Sampling transistor 108 within replica circuitry 200 may have a gate terminal configured to receive VDD (e.g., transistor 108 within the replica may be always activated). Current Iout' output from transistor 130 may be fed to the VLN transistors T1 and T2 within replica circuitry 200. Configured in this way, control voltage generator 110 will output voltage Vctrl that yields the desired current level Ib flowing through the VLN transistors of each pixel column.

FIG. 6 is a timing diagram showing illustrative signal waveforms involved in operating the current source and threshold voltage mismatch mitigation circuitry of the type shown in connection with FIGS. 3-5. At time t1, signals Ref_en and Samp are asserted to activate transistors 104 and 108, respectively. While signals Ref_en and Samp are driven high, signal Cal can be pulsed high (see pulse 210) to temporarily activate autozero transistor 106. This will allow a reference current Iref to flow from long-channel transistor 102 down to node X through current source transistor T2. The gate voltage of T2 will be set appropriately to sink the reference current Iref due to the diode connection of transistor t2. At time t2, signal Ref_en is driven low to turn off transistor 104. The time period between t1 and t2 is sometimes referred to as the calibration phase. During the calibration phase, reference current Iref is forced through current source transistor T2 so that the gate voltage of transistor T2 is adjusted based on Iref to remove variation in the threshold voltage of T2 (i.e., to cancel out Vt variations). This Vt cancelling also occurs at the replica circuitry 200.

At time t3, signal Ref_byp, Fb_en, and Vcasc_ctrl are asserted (driven high). Asserting signal Ref_byp will turn on transistor 105 in each pixel column to help provide the same IR drop on the ground line during the calibration phase and the control phase from time t3 to t4. Asserting signal Fb_en will connect the control output port of generator 110 to the drain terminal of transistor 130, which shifts control voltage Vctrl from bias voltage level Vb to some other level depending on whether Iref is greater than or less than bias current Ib. If bias current Ib is greater than reference current Iref, control voltage Vctrl will rise (as shown by waveform 212). If bias current Ib is less than reference current Iref, control voltage Vctrl will fall (as shown by waveform 214).

Asserting signal Vcasc_ctrl will only turn on the cascode transistor T2 in the replica circuitry 200 of generator 110. Note that cascode transistor T2 in each of the pixel columns will remain off during this time since as indicated by the low Vcascode voltage. The time period between t3 and t4 is sometimes referred to as the control phase. During the control phase, replica circuitry 200 is forced to be part of a feedback loop and its output Iout' is set equal to bias current Ib by adjusting control voltage Vctrl. Voltage Vctrl is also simultaneously sampled by the columns since signal Samp is still asserted during the control phase. Signals Ref_byp and Vcasc_ctrl are driven low some time after time t4.

At time t4, signal Vcascode is asserted (e.g., driven high) to activate the VLN cascode transistor in each pixel column. This enables the desired output current to flow through pixel output line 38 in each column (as shown by Iout being adjusted to the desired bias current Ib at time t5). The period after time t5 is sometimes referred to as the output enable phase. Operated in this way, any mismatch in Iout from column to column can be reduced by a factor of 5-10×.

The timing and order of operations as shown in FIG. 6 is merely illustrative. At least some of the described steps may be modified or omitted; some of the described steps may be performed in parallel; additional steps may be added or inserted between the described steps; the order of certain steps may be reversed or altered; the timing of the described steps may be adjusted so that they occur at slightly different times, or the described steps may be distributed in a system.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor, comprising:
   an image sensor pixel;
   a pixel output line coupled to the image sensor pixel;
   a current source transistor coupled to the pixel output line; and
   a threshold voltage mismatch mitigation circuit coupled to the current source transistor, wherein the threshold voltage mismatch mitigation circuit comprises:
   a reference current generator transistor coupled to a source-drain terminal of the current source transistor and configured to output a reference current for the current source transistor; and an autozero transistor coupled between the source-drain terminal and a gate terminal of the current source transistor.

2. The image sensor of claim 1, further comprising:
a cascode transistor coupled between the pixel output line and the current source transistor.

3. The image sensor of claim 1, wherein the current source transistor has a first gate length and wherein the reference current generator transistor comprises:
a p-type transistor having a second gate length that is greater than the first gate length.

4. The image sensor of claim 3, wherein the second gate length is at least five times longer than the first gate length.

5. The image sensor of claim 3, wherein the p-type transistor has a source terminal configured to receive a first power supply voltage and has a gate terminal configured to receive a second power supply voltage less than the first power supply voltage.

6. The image sensor of claim 3, wherein the threshold voltage mismatch mitigation circuit comprises:
an enable transistor coupled between the p-type transistor and the current source transistor, the enable transistor having a gate terminal configured to receive an enable signal.

7. The image sensor of claim 6, wherein the threshold voltage mismatch mitigation circuit comprises:
a bypass transistor configured to connect the p-type transistor to a ground line.

8. The image sensor of claim 1, wherein the threshold voltage mismatch mitigation circuit comprises:
a capacitor having a first terminal coupled to the gate terminal of the current source transistor and having a second terminal coupled to a ground line.

9. The image sensor of claim 8, wherein the threshold voltage mismatch mitigation circuit comprises:
an additional capacitor having a first terminal coupled to the gate terminal of the current source transistor and having a second terminal.

10. The image sensor of claim 9, wherein the threshold voltage mismatch mitigation circuit comprises:
a sampling transistor having a first source-drain terminal coupled to the second terminal of the additional capacitor, having a second source-drain terminal configured to receive a control voltage, and having a gate terminal configured to receive a sampling control signal.

11. The image sensor of claim 10, further comprising:
a control voltage generator configured to generate the control voltage.

12. An image sensor, comprising:
an image sensor pixel;
a pixel output line coupled to the image sensor pixel;
a current source transistor coupled to the pixel output line, the current source transistor having a first gate length and having a threshold voltage; and
a threshold voltage mismatch mitigation circuit coupled to the current source transistor and configured to produce an output current on the pixel output line that does not vary as a function of the threshold voltage of the current source transistor, wherein the threshold voltage mismatch mitigation circuit comprises a reference current generator configured to output a reference current to the current source transistor and wherein the reference current generator comprises a p-type transistor having a second gate length that is greater than the first gate length.

13. The image sensor of claim 12, wherein the second gate length is at least five times longer than the first gate length.

14. The image sensor of claim 12, wherein the p-type transistor has a source terminal configured to receive a first power supply voltage and has a gate terminal configured to receive a second power supply voltage less than the first power supply voltage.

15. The image sensor of claim 12, wherein the threshold voltage mismatch mitigation circuit comprises:
an enable transistor coupled between the p-type transistor and the current source transistor, the enable transistor having a gate terminal configured to receive an enable signal.

16. The image sensor of claim 15, wherein the threshold voltage mismatch mitigation circuit comprises:
a bypass transistor configured to connect the p-type transistor to a ground line.

17. An image sensor, comprising:
an image sensor pixel;
a pixel output line coupled to the image sensor pixel;
a current source transistor coupled to the pixel output line, the current source transistor having a threshold voltage and having a drain terminal and a gate terminal; and
a threshold voltage mismatch mitigation circuit coupled to the current source transistor and configured to produce an output current on the pixel output line that does not vary as a function of the threshold voltage of the current source transistor, wherein the threshold voltage mismatch mitigation circuit comprises an autozero transistor coupled across the drain and gate terminals of the current source transistor.

18. The image sensor of claim 17, wherein the threshold voltage mismatch mitigation circuit comprises:
a capacitor having a first terminal coupled to the gate terminal of the current source transistor and having a second terminal coupled to a ground line.

19. The image sensor of claim 18, wherein the threshold voltage mismatch mitigation circuit comprises:
an additional capacitor having a first terminal coupled to the gate terminal of the current source transistor and having a second terminal.

20. The image sensor of claim 19, wherein the threshold voltage mismatch mitigation circuit comprises:
a sampling transistor having a first source-drain terminal coupled to the second terminal of the additional capacitor, having a second source-drain terminal configured to receive a control voltage, and having a gate terminal configured to receive a sampling control signal.

21. The image sensor of claim 20, further comprising:
a control voltage generator configured to generate the control voltage.

* * * * *